(12) United States Patent
Zhou

(10) Patent No.: US 9,588,274 B2
(45) Date of Patent: Mar. 7, 2017

(54) LIGHT BAR AND BACKLIGHT MODULE USING SAME

(71) Applicant: Shenzhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 40 days.

(21) Appl. No.: 14/356,246

(22) PCT Filed: Mar. 25, 2014

(86) PCT No.: PCT/CN2014/074051
§ 371 (c)(1),
(2) Date: May 5, 2014

(87) PCT Pub. No.: WO2015/123910
PCT Pub. Date: Aug. 27, 2015

(65) Prior Publication Data
US 2015/0241617 A1 Aug. 27, 2015

(30) Foreign Application Priority Data
Feb. 21, 2014 (CN) .......................... 2014 1 0061123

(51) Int. Cl.
*F21V 17/16* (2006.01)
*F21V 9/16* (2006.01)
*F21V 8/00* (2006.01)

(52) U.S. Cl.
CPC .............. *G02B 6/0026* (2013.01); *F21V 9/16* (2013.01); *F21V 17/16* (2013.01); *G02B 6/009* (2013.01);
(Continued)

(58) Field of Classification Search
CPC ....................................................... F21V 17/16
(Continued)

(56) References Cited

U.S. PATENT DOCUMENTS

2011/0309325 A1* 12/2011 Park et al. ....................... 257/13
2012/0127752 A1* 5/2012 Jung .............................. 362/602
(Continued)

FOREIGN PATENT DOCUMENTS

CN          103499054 A         1/2014
KR       20110068109 A    *    6/2011

*Primary Examiner* — Jong-Suk (James) Lee
*Assistant Examiner* — Eric T Eide
(74) *Attorney, Agent, or Firm* — Andrew C. Cheng

(57) ABSTRACT

The present invention provides a light bar and a backlight module using the light bar. The light bar includes: a circuit board (2), a quantum dot rail (4) mounted and fixed to the circuit board (2), and a light source (6) mounted to the circuit board (2) and located between the circuit board (2) and the quantum dot rail (4). The light source (6) is electrically connected to the circuit board (2). In the light bar and the backlight module using the light bar according to the present invention, the retention members are mounted to the circuit board of the light bar to allow the quantum dot rail to be directly mounted to the circuit board through snap engagement so as to enhance color saturation and at the same time simplifying the mounting structure and effectively reducing the manufacturing cost. Further, the retention members are made elastic components that can effectively protect the quantum dot rail from being damaged by external forces acting on the quantum dot rail and can simplifying the process of mounting thereby further reducing the manufacturing cost.

8 Claims, 3 Drawing Sheets

(52) U.S. Cl.
CPC ......... *G02B 6/0023* (2013.01); *G02B 6/0088* (2013.01); *G02B 6/0068* (2013.01); *G02B 6/0073* (2013.01); *G02B 6/0083* (2013.01)

(58) Field of Classification Search
USPC .............................. 362/602, 608, 610, 612
See application file for complete search history.

(56) References Cited

U.S. PATENT DOCUMENTS

| | | | |
|---|---|---|---|
| 2012/0281151 A1* | 11/2012 | Abe | 348/739 |
| 2013/0050612 A1* | 2/2013 | Hur et al. | 349/62 |
| 2013/0128617 A1* | 5/2013 | Lee | 362/611 |
| 2014/0286049 A1* | 9/2014 | Cha | G02B 6/0023 362/609 |

* cited by examiner

LIGHT BAR AND BACKLIGHT MODULE USING SAME

BACKGROUND OF THE INVENTION

1. Field of the Invention

The present invention relates to the field of flat panel displaying, and in particular to a light bar and a backlight module using the light bar.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is composed of a color filter (CF) substrate, a thin-film transistor (TFT) array substrate, and a liquid crystal layer arranged between the two substrates and the principle of operation is that a driving voltage is applied to the two glass substrates to control rotation of the liquid crystal molecules of the liquid crystal layer in order to refract out light emitting from the backlight module for generating images. Since the liquid crystal panel itself does not emit light, light must be provided from the backlight module in order to normally display images. Thus, the backlight module is one of the key components of the liquid crystal displays. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal display panel. The side-edge backlight module comprises an LED light bar, serving as a backlight source, which is arranged at an edge of a backplane to be located rearward of one side of the liquid crystal display panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal display panel.

With the development of the human society, the general consumers have increasingly high requirement for the quality of the image displayed by a liquid crystal display device. To improve the color saturation of an image, in a known technique, a quantum dot rail is mounted in a backlight module. However, mounting a quantum dot rail needs to use a special mounting member. This increases the complication of the structure of the backlight module and also increases the manufacturing costs and assembling costs.

SUMMARY OF THE INVENTION

An object of the present invention is to provide a light bar, which comprises a quantum dot rail mounted to a circuit board in order to effectively increase image color saturation, while realize a simple structure and a relatively low cost.

Another object of the present invention is to provide a backlight module that has high image color saturation to effectively meet the needs of users and has a simple structure and is easy to assemble so as to effectively reduce the manufacturing cost.

To achieve the above objects, the present invention provides a light bar, which comprises: a circuit board, a quantum dot rail mounted and fixed to the circuit board, and a light source mounted to the circuit board and located between the circuit board and the quantum dot rail. The light source is electrically connected to the circuit board.

The circuit board comprises a plurality of retention members. The quantum dot rail are received and retained in the retention members through snap engagement.

The retention members are mounted to the circuit board by means of surface mount technology.

Each of the retention members comprises a mounting section that is fixed to the circuit board and a retention section mounted to a free end of the mounting section. The retention section defines therein a retention channel. The quantum dot rail is received and retained in the retention channel through snap engagement.

The retention section is made of an elastic material.

The present invention also provides a backlight module, which comprises: a backplane, a light guide plate mounted in the backplane, and a light bar mounted in the backplane. The light bar comprises a circuit board, a quantum dot rail mounted and fixed to the circuit board, and a light source mounted to the circuit board and located between the circuit board and the quantum dot rail. The light source is electrically connected to the circuit board.

The circuit board comprises a plurality of retention members. The quantum dot rail is received and retained in the retention members through snap engagement.

The retention members are mounted to the circuit board by means of surface mount technology.

Each of the retention members comprises a mounting section that is fixed to the circuit board and a retention section mounted to a free end of the mounting section. The retention section defines therein a retention channel. The quantum dot rail is received and retained in the retention channel through snap engagement.

The retention section is made of an elastic material.

The present invention further provides a backlight module, which comprises: a backplane, a light guide plate mounted in the backplane, and a light bar mounted in the backplane, the light bar comprising a circuit board, a quantum dot rail mounted and fixed to the circuit board, and a light source mounted to the circuit board and located between the circuit board and the quantum dot rail, the light source being electrically connected to the circuit board;

wherein the circuit board comprises a plurality of retention members, the quantum dot rail being received and retained in the retention members through snap engagement.

The retention members are mounted to the circuit board by means of surface mount technology.

Each of the retention members comprises a mounting section that is fixed to the circuit board and a retention section mounted to a free end of the mounting section. The retention section defines therein a retention channel. The quantum dot rail is received and retained in the retention channel through snap engagement.

The retention section is made of an elastic material.

The efficacy of the present invention is that the present invention provides a light bar and a backlight module using the light bar, in which retention members are mounted to a circuit board of the light bar to allow a quantum dot rail to be directly mounted to the circuit board through snap engagement so as to enhance color saturation and at the same time simplifying the mounting structure and effectively reducing the manufacturing cost. Further, the retention members are made elastic components that can effectively protect the quantum dot rail from being damaged by external forces acting on the quantum dot rail and can simplifying the process of mounting thereby further reducing the manufacturing cost.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
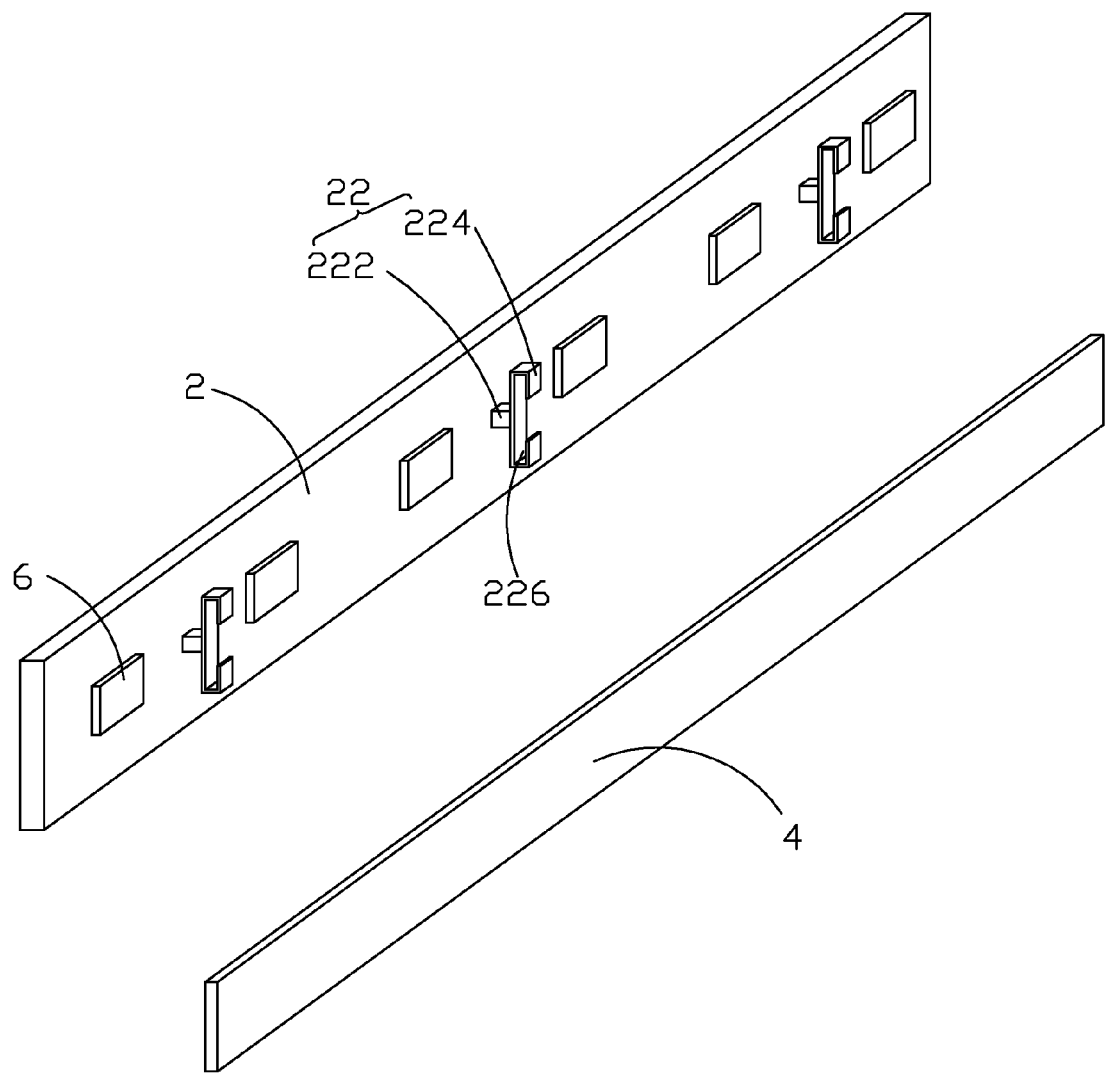
FIG. 1 is an exploded view showing a light bar according to the present invention.
Figure 2:
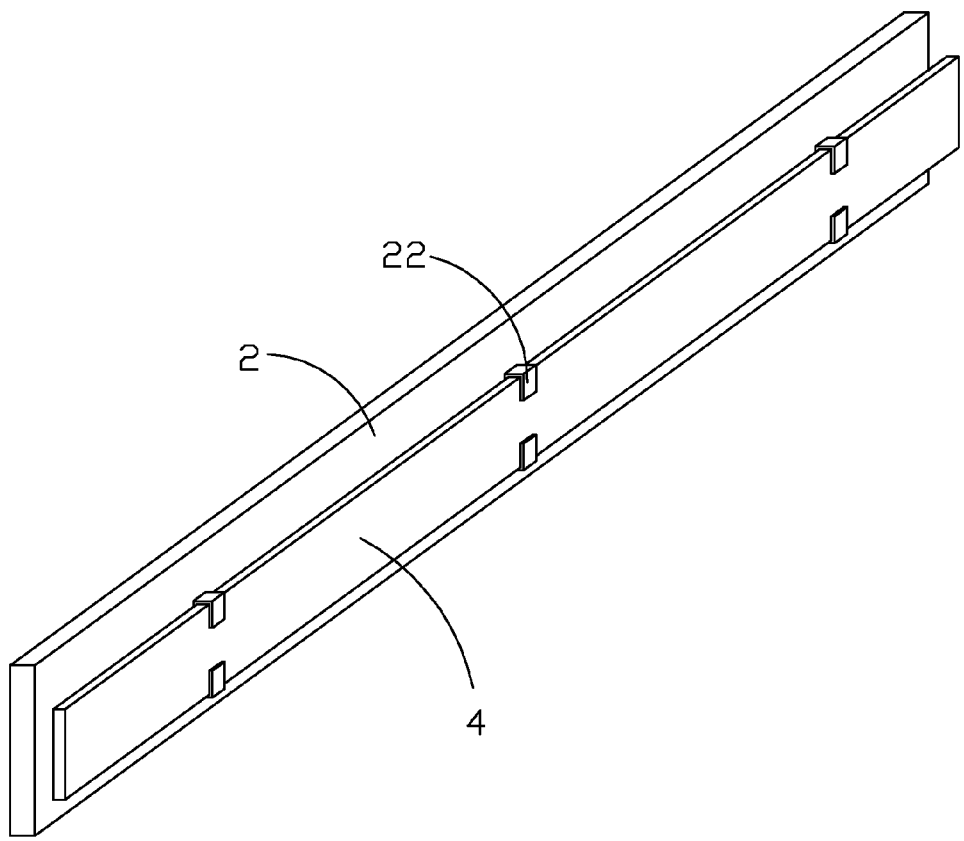
FIG. 2 is a perspective view, in an assembled form, showing the light bar according to the present invention.

Referring to FIGS. 1 and 2, the present invention provides a light bar, which comprises: a circuit board 2, a quantum dot rail 4 mounted and fixed to the circuit board 2, and a light source 6 mounted to the circuit board 2 and located between the circuit board 2 and the quantum dot rail 4. The light source 6 is electrically connected to the circuit board 2. In the present invention, the quantum dot rail 4 is provided and mounted to the circuit board 2 so as to enhance color saturation of the light bar, while simplifying the mounting structure and reducing the manufacturing cost.

Referring to FIG. 1, the circuit board 2 comprises a plurality of retention members 22 mounted thereon. The quantum dot rail 4 is received and retained in the retention members 22 through snap engagement. In the instant embodiment, the retention members 22 are mounted and fixed to the circuit board 2 by means of SMT (Surface Mount Technology). The quantum dot rail 4 is mounted and fixed to the circuit board 2 through snap engagement so that the mounting is easy and the assembling cost can be effectively reduced.

Specifically, in the instant embodiment, each of the retention members 22 comprises a mounting section 222 that is fixed to the circuit board 2 and a retention section 224 mounted to a free end of the mounting section 222. The retention section 224 defines a retention channel 226 and the quantum dot rail 4 is received and retained in the retention channel 226 through snap engagement. Further, in the instant embodiment, the retention members 22 are each made of an elastic material in the entirety thereof. In other embodiment, it is also feasible that only the retention section 224 is made of an elastic material.

To assemble, the quantum dot rail 4 can be inserted into the retention channels 226 from one end of the circuit board 2. Since the retention sections 224 are made of an elastic material, openings of the retention channels 226 can be varied to widen so as to allow for easy insertion of the quantum dot rail 4. Once the quantum dot rail 4 is completely inserted into the retention channels 226, the elasticity makes the retention channels 226 to tightly engage and retain the quantum dot rail 4 so that the quantum dot rail 4 can be securely retained and mounted on the circuit board 2 to prevent the quantum dot rail 4 from being damaged due to unexpected falling of the quantum dot rail 4 during shipment.

Figure 3:
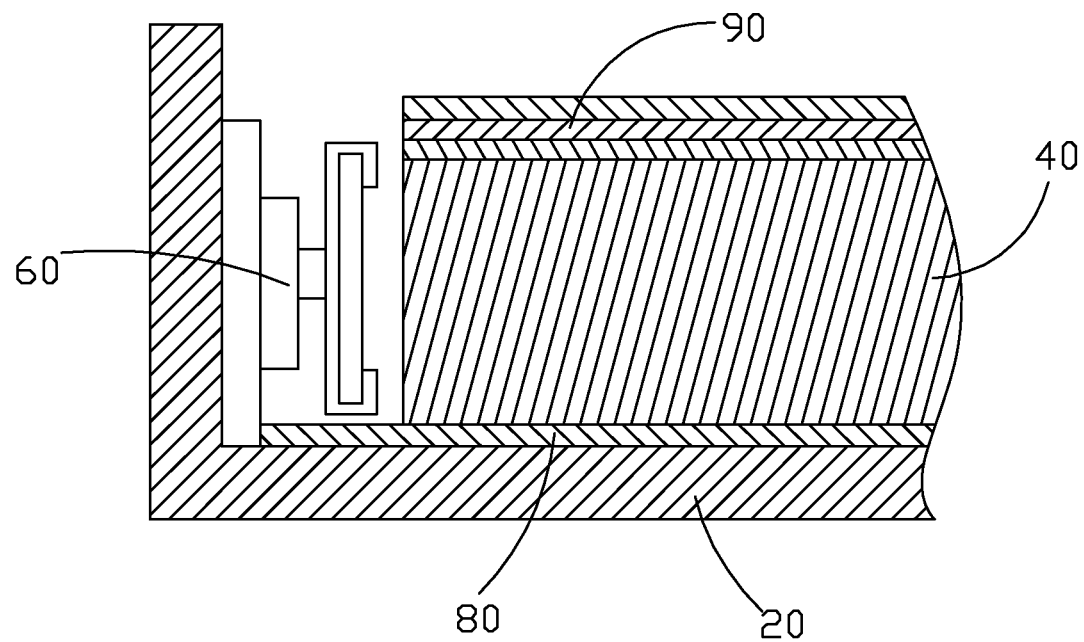
FIG. 3 is a cross-sectional view showing a backlight module according to the present invention.

Referring to FIG. 3, with additional reference being had to FIGS. 1 and 2, the present invention also provides a backlight module, which comprises: a backplane 20, a light guide plate 40 mounted in the backplane 20, and a light bar 60 mounted in the backplane 20. The light bar 60 comprises a circuit board 2, a quantum dot rail 4 mounted and fixed to the circuit board 2, and a light source 6 mounted to the circuit board 2 and located between the circuit board 2 and the quantum dot rail 4. The light source 6 is electrically connected to the circuit board 2. In the present invention, the quantum dot rail 4 is provided and mounted to the circuit board 2 so as to enhance color saturation of the light bar, while simplifying the mounting structure and reducing the manufacturing cost.

Referring to FIG. 1, the circuit board 2 comprises a plurality of retention members 22 mounted thereon. The quantum dot rail 4 is received and retained in the retention members 22 through snap engagement. In the instant embodiment, the retention members 22 are mounted and fixed to the circuit board 2 by means of SMT (Surface Mount Technology). The quantum dot rail 4 is mounted and fixed to the circuit board 2 through snap engagement so that the mounting is easy and the assembling cost can be effectively reduced.

Specifically, in the instant embodiment, each of the retention members 22 comprises a mounting section 222 that is fixed to the circuit board 2 and a retention section 224 mounted to a free end of the mounting section 222. The retention section 224 defines a retention channel 226 and the quantum dot rail 4 is received and retained in the retention channel 226 through snap engagement. Further, in the instant embodiment, the retention members 22 are each made of an elastic material in the entirety thereof. In other embodiment, it is also feasible that only the retention section 224 is made of an elastic material.

To assemble, the quantum dot rail 4 can be inserted into the retention channels 226 from one end of the circuit board 2. Since the retention sections 224 are made of an elastic material, openings of the retention channels 226 can be varied to widen so as to allow for easy insertion of the quantum dot rail 4. Once the quantum dot rail 4 is completely inserted into the retention channels 226, the elasticity makes the retention channels 226 to tightly engage and retain the quantum dot rail 4 so that the quantum dot rail 4 can be securely retained and mounted on the circuit board 2 to prevent the quantum dot rail 4 from being damaged due to unexpected falling of the quantum dot rail 4 during shipment.

It is noted that the backlight module may further comprise a reflector plate 80 arranged under the light guide plate 40 and an optic film assembly 90 arranged above the light guide plate 40. The reflector plate 80 reflects light emitting from the light bar 60 back into the light guide plate 40 so as to improve the light intensity of the backlight module. The optic film assembly 90 functions to homogenize the light so as improve the illumination uniformity of the backlight module.

In summary, the present invention provides a light bar and a backlight module using the light bar, in which retention members are mounted to a circuit board of the light bar to allow a quantum dot rail to be directly mounted to the circuit board through snap engagement so as to enhance color saturation and at the same time simplifying the mounting structure and effectively reducing the manufacturing cost. Further, the retention members are made elastic components that can effectively protect the quantum dot rail from being damaged by external forces acting on the quantum dot rail and can simplifying the process of mounting thereby further reducing the manufacturing cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A light bar, comprising: a circuit board, a quantum dot rail mounted and fixed to the circuit board, and a light source mounted to the circuit board and located between the circuit board and the quantum dot rail, the light source being electrically connected to the circuit board;

wherein the circuit board comprises a plurality of retention members mounted thereto, each of the retention members comprising a mounting section that has an end fixed to the circuit board and an opposite, free end to which a retention section is mounted to carry and support the quantum dot rail in position, the mounting section and the retention section being each formed of an elastic material, the mounting section being in the form of a slender pillar smaller in cross-sectional area than the retention section;

wherein the retention section of each of the retention members comprises a bottom wall that is mounted to the free end of the slender pillar of the mounting section to be spaced from the circuit board, the light source that is mounted to the circuit board is located between the bottom wall of the retention section and the circuit board;

wherein the retention section of each of the retention members comprises two separate U-shaped end configurations that are connected to each other by the bottom wall to have openings thereof facing each other so as to define a retention channel, the quantum dot rail being received and retained in the retention channel and supported on the bottom wall of the retention member to be spaced from the circuit board and the light source;

wherein the plurality of retention members are arranged to be spaced from each other so as to expose a portion of the quantum dot rail that is located between the bottom walls of the retention sections of two adjacent ones of the retention members to the light source directly mounted on the circuit board;

wherein the circuit board has a surface on which the light source is mounted and the mounting sections of the retention members are fixed to the surface of the circuit board and distributed on the surface of the circuit board in a predetermined direction so as to be alternate with the light source in the predetermined direction, the quantum dot rail being carried and supported on the retention sections of the retention members to extend in the predetermined direction.

2. The light bar as claimed in claim 1, wherein the quantum dot rail is received and retained in the retention channel of the retention section of the retention members through snap engagement.

3. The light bar as claimed in claim 1, wherein the mounting sections of the retention members are mounted to the circuit board by means of surface mount technology.

4. A backlight module, comprising: a backplane, a light guide plate mounted in the backplane, and a light bar mounted in the backplane, the light bar comprising a circuit board, a quantum dot rail mounted and fixed to the circuit board, and a light source mounted to the circuit board and located between the circuit board and the quantum dot rail, the light source being electrically connected to the circuit board;

wherein the circuit board comprises a plurality of retention members mounted thereto, each of the retention members comprising a mounting section that has an end fixed to the circuit board and an opposite, free end to which a retention section is mounted to carry and support the quantum dot rail in position, the mounting section and the retention section being each formed of an elastic material, the mounting section being in the form of a slender pillar smaller in cross-sectional area than the retention section;

wherein the retention section of each of the retention members comprises a bottom wall that is mounted to the free end of the slender pillar of the mounting section to be spaced from the circuit board, the light source that is mounted to the circuit board is located between the bottom wall of the retention section and the circuit board;

wherein the retention section of each of the retention members comprises two separate U-shaped end configurations that are connected to each other by the bottom wall to have openings thereof facing each other so as to define a retention channel, the quantum dot rail being received and retained in the retention channel and supported on the bottom wall of the retention member to be spaced from the circuit board and the light source;

wherein the plurality of retention members are arranged to be spaced from each other so as to expose a portion of the quantum dot rail that is located between the bottom walls of the retention sections of two adjacent ones of the retention members to the light source directly mounted on the circuit board; and wherein the circuit board has a surface on which the light source is mounted and the mounting sections of the retention members are fixed to the surface of the circuit board and distributed on the surface of the circuit board in a predetermined direction so as to be alternate with the light source in the predetermined direction, the quantum dot rail being carried and supported on the retention sections of the retention members to extend in the predetermined direction.

5. The backlight module as claimed in claim 4, wherein the quantum dot rail is received and retained in the retention channel of the retention section of the retention members through snap engagement.

6. The backlight module as claimed in claim 4, wherein the mounting sections of the retention members are mounted to the circuit board by means of surface mount technology.

7. A backlight module, comprising: a backplane, a light guide plate mounted in the backplane, and a light bar mounted in the backplane, the light bar comprising a circuit board, a quantum dot rail mounted and fixed to the circuit board, and a light source mounted to the circuit board and located between the circuit board and the quantum dot rail, the light source being electrically connected to the circuit board;

wherein the circuit board comprises a plurality of retention members mounted thereto, each of the retention members comprising a mounting section that has an end fixed to the circuit board and an opposite, free end to which a retention section is mounted to carry and support the quantum dot rail in position, the mounting section and the retention section being each formed of an elastic material, the mounting section being in the form of a slender pillar smaller in cross-sectional area than the retention section;

wherein the retention section of each of the retention members comprises a bottom wall that is mounted to the free end of the slender pillar of the mounting section to be spaced from the circuit board, the light source that is mounted to the circuit board is located between the bottom wall of the retention section and the circuit board;

wherein the retention section of each of the retention members comprises two separate U-shaped end configurations that are connected to each other by the bottom wall to have openings thereof facing each other so as to define a retention channel, the quantum dot rail being received and retained in the retention channel and supported on the bottom wall of the retention member to be spaced from the circuit board and the light source;

wherein the quantum dot rail is received and retained in the retention channel of the retention section of the retention members through snap engagement;

wherein the plurality of retention members are arranged to be spaced from each other so as to expose a portion of the quantum dot rail that is located between the bottom walls of the retention sections of two adjacent ones of the retention members to the light source directly mounted on the circuit board; and wherein the circuit board has a surface on which the light source is mounted and the mounting sections of the retention members are fixed to the surface of the circuit board and distributed on the surface of the circuit board in a predetermined direction so as to be alternate with the light source in the predetermined direction, the quantum dot rail being carried and supported on the retention sections of the retention members to extend in the predetermined direction.

8. The backlight module as claimed in claim 7, wherein the mounting sections of the retention members are mounted to the circuit board by means of surface mount technology.

* * * * *